United States Patent [19]

Dole et al.

[11] Patent Number: 5,116,560

[45] Date of Patent: May 26, 1992

[54] METHOD OF FORMING RARE EARTH OXIDE CERAMIC SCINTILLATOR WITH AMMONIUM DISPERSION OF OXALATE PRECIPITATES

[75] Inventors: Stephen Lee Dole, Burnt Hills; Subramaniam Venkataramani, Clifton Park, both of N.Y.

[73] Assignee: General Electric Company, Schenectady, N.Y.

[21] Appl. No.: 673,608

[22] Filed: Mar. 22, 1991

[51] Int. Cl.⁵ .............................. C04B 35/50
[52] U.S. Cl. ...................... 264/65; 264/1.2; 252/301.4 R
[58] Field of Search ................ 264/1.2, 65; 252/301.4 R

[56] References Cited

U.S. PATENT DOCUMENTS

| | | | |
|---|---|---|---|
| 4,421,671 | 12/1983 | Cusano et al. | 252/310.4 F |
| 4,466,929 | 8/1984 | Greskovich et al. | 264/1.2 |
| 4,466,930 | 8/1984 | Greskovich et al. | 264/1.2 |
| 4,518,545 | 5/1985 | Cusano et al. | 264/1.2 |
| 4,525,628 | 6/1985 | DiBianca et al. | 250/367 |
| 4,747,973 | 5/1988 | Cusano et al. | 252/301.4 |
| 4,755,492 | 7/1988 | Greskovich | 264/1.2 |
| 5,021,376 | 6/1991 | Nienburg | 264/86 |

Primary Examiner—James Derrington
Attorney, Agent, or Firm—James E. McGinness; James C. Davis, Jr.; James Magee, Jr.

[57] ABSTRACT

A method of forming polycrystalline rare earth oxide ceramic scintillators formed by dissolving a mixture of oxides of the scintillator in an aqueous hydrochloric or nitric acid solution to form a rare earth solution, precipitating oxalates from the rare earth solution, calcining the oxalates to form the respective oxides, cold pressing the oxides to form a compact, and sintering the compact in a reducing atmosphere or vacuum to form the scintillator, the method being improved by precipitating the oxalates by admixing the rare earth solution with an oxalic solution comprised of, oxalic acid and ammonium ions in an amount that disperses the oxalate precipitates.

21 Claims, No Drawings

METHOD OF FORMING RARE EARTH OXIDE CERAMIC SCINTILLATOR WITH AMMONIUM DISPERSION OF OXALATE PRECIPITATES

This application is related to copending applications, Ser. Nos. 07/660,462, filed Feb. 26, 1991, Ser. No. 07/657,032, filed Feb. 19, 1991.

The present invention is related to a method of forming rare earth oxide ceramic scintillators for computerized tomography (CT) and other x-ray, gamma radiation, and nuclear radiation detecting applications. More specifically, the method relates to forming polycrystalline rare earth oxide ceramic scintillators having improved optical clarity.

BACKGROUND OF THE INVENTION

Computerized tomography scanners are medical diagnostic instruments in which the subject is exposed to a relatively planar beam or beams of x-ray radiation, the intensity of which varies in direct relationship to the energy absorption along a plurality of subject body paths. By measuring the x-ray intensity (i.e., the x-ray absorption) along these paths from a plurality of different angles or views, an x-ray absorption coefficient can be computed for various areas in any plane of the body through which the radiation passes. These areas typically comprise approximately a square portion of about 1 mm × 1 mm. The absorption coefficients are used to produce a display of, for example, the bodily organs or structural members of industrial equipment intersected by the x-ray beam.

An integral and important part of the scanner is the x-ray detector which receives the x-ray radiation which has been modulated by passage through the particular body under study. Generally, the x-ray detector contains a scintillator material which, when excited by the impinging x-ray radiation, emits optical wavelength radiation. In typical medical or industrial applications, the optical output from the scintillator material is made to impinge upon photoelectrically responsive materials in order to produce electrical output signals, the amplitude of which is directly related to the intensity of the impinging x-ray radiation. The electrical signals are digitized for processing by digital computer means which generates the absorption coefficients in a form suitable for display on a cathode ray tube screen or other permanent media.

Due to the specific and demanding computerized tomography requirements, not all scintillator materials which emit optical radiation upon excitation by x-ray or gamma ray radiation are suitable for computerized tomography applications. Useful scintillators must be efficient converters of x-ray radiation into optical radiation in those regions of the electromagnetic spectrum (visible and near visible) which are most efficiently detected by photosensors such as photomultipliers or photodiodes. It is also desirable that the scintillator have a high optical clarity, i.e., transmit the optical radiation efficiently to avoid optical trapping, such that optical radiation originating deep in the scintillator body escapes for detection by externally situated photodetectors. This is particularly important in medical diagnostic applications where it is desirable that x-ray dosage be as small as possible to minimize patient exposure, while maintaining adequate quantum detection efficiency and a high signal-to-noise ratio.

Among other desirable scintillator material properties are short afterglow or persistence, low hysteresis, high x-ray stopping power, and spectral linearity. Afterglow is the tendency of the scintillator to continue emitting optical radiation for a time after termination of x-ray excitation, resulting in blurring, with time, of the information-bearing signal. Short afterglow is highly desirable in applications requiring rapid sequential scanning such as, for example, in imaging moving bodily organs. Hysteresis is the scintillator material property whereby the optical output varies for identical x-ray excitation based on the radiation history of the scintillator. Hysteresis is undesirable due to the requirement in computerized tomography for repeated precise measurements of optical output from each scintillator cell and where the optical output must be substantially identical for identical x-ray radiation exposure impinging on the scintillator body. Typical detecting accuracies are on the order of one part in one thousand for a number of successive measurements taken at relatively high rate. High x-ray stopping power is desirable for efficient x-ray detection. X-rays not absorbed by the scintillator escape detection. Spectral linearity is another important scintillator material property because x-rays impinging thereon have different frequencies. Scintillator response must be substantially uniform at all x-ray frequencies.

Compositions and methods of forming polycrystalline, rare earth oxide, ceramic scintillators having high optical clarity, density, uniformity, cubic structure, and useful in computerized tomography scanners, are disclosed in U.S. Pat. Nos. 4,421,671, 4,518,545, 4,525,628, 4,466,929, 4,466,930, and 4,747,973, incorporated herein by reference. Briefly described, the polycrystalline ceramic scintillators are formed of a rare earth oxide selected from the group consisting of $Gd_2O_3$, $Y_2O_3$, $La_2O_3$, $Lu_2O_3$, and mixtures thereof that form a cubic crystal structure. The rare earth oxide is doped with a rare earth activator such as europium, neodymium, ytterbium, dysprosium, terbium, and praseodymium to form the cubic crystal structure which scintillates at a predetermined wave length. Optionally, transparency promoters such as $ThO_2$, $ZrO_2$, and $Ta_2O_5$ can be added in an amount sufficient to improve the transparency of the ceramic scintillator, and a light output restorer such as CaO or SrO in an amount sufficient to effect a higher light output.

An important step in forming the rare earth oxide ceramic scintillators is the preparation of a suitable powder containing the desired scintillator material constituents. Suitable powders have submicron-to-micron powder particles, and are, for example, 99.99% to 99.9999% pure. Powder particle size is submicron-to-micron to provide high optical clarity, larger particle size results in higher porosity and loss of optical clarity when the powder is sintered to form the scintillator body. A known method for forming the desired starting powder employs a wet chemical oxalate precipitation process. The selected molar percentages of the nitrates of yttrium, gadolinium, europium, niobium, ytterbium, dysprosium, terbium, and praseodymium, are dissolved in water. The aqueous nitrate solution of the desired scintillator material constituents is admixed with a solution of oxalic acid which is, for example, 80% saturated at room temperature. The resulting coprecipitated oxalates are washed, neutralized, filtered, and dryed in air at about 100° C. for approximately 8 hours. The oxalates are then calcined, thermally decomposed, in air at approximately 700° C. to about 900° C. for a time ranging from one to four hours to form the corresponding oxides. Typically, heating for one hour at 800° C. is sufficient. Preferably, the oxalates or the resulting oxides are milled by one of several methods such as ball, colloid, or fluid energy milling to enhance optical clarity when the powder is sintered to form the scintillator.

Selected amounts of the powder composition are formed into powder compacts by either die pressing, or die pressing followed by isostatic pressing to further increase green density. The compact is densified by sintering, sintering plus gas hot isostatic pressing, or ceramic hot pressing methods. In the known methods for forming the rare earth ceramic scintillator materials described above, optical clarity is most improved in the sintered scintillators formed from milled oxalate or oxide powders.

It is an object of this invention to provide a simplified method for achieving high optical clarity in rare earth oxide ceramic scintillators without performing the step of milling the oxalate or oxide powders.

It is another object of this invention to form finely divided rare earth oxide ceramic scintillator powders by a precipitating oxalates of the scintillator from a solution containing ammonium ions.

The terms "transparency" and "translucency", as used herein, describe various degrees of optical clarity in the scintillator material. Typically, the inventive scintillator materials exhibit an optical attenuation coefficient of less than 100 cm$^{-1}$, as measured by standard spectral transmittance tests (i.e., "narrow" angle transmission) on a polished scintillator material plate, at the luminescent wavelength of the respective ion. The most desirable scintillator materials have lower attenuation coefficients and hence higher optical clarity, i.e., higher transparency.

BRIEF DESCRIPTION OF THE INVENTION

We have discovered a simplified method of forming high optical clarity rare earth oxide ceramic scintillators. The high optical clarity obtained in scintillators made by known methods using milled oxalate powders, is obtained in scintillators formed by the method of this invention without the need for milling the oxalate powder.

Polycrystalline rare earth oxide ceramic scintillators are formed by dissolving a mixture of oxides of the scintillator in an aqueous hydrochloric or nitric acid solution to form a rare earth solution, precipitating oxalates from the rare earth solution, calcining the oxalates to form the respective oxides, cold pressing the oxides to form a compact, and sintering the compact in a reducing atmosphere or vacuum to form the scintillator. The improvement of this method comprises, precipitating the oxalates by admixing the rare earth solution with an oxalic solution comprised of, oxalic acid and ammonium ions in an amount that disperses the oxalate precipitates. Preferably, the ammonium ions are in a ratio of at least one mole of ammonium ions per mole of rare earth ions.

DETAILED DESCRIPTION OF THE INVENTION

We have discovered that by precipitating rare earth oxalates from an oxalic solution comprised of oxalic acid and ammonium ions, a more finely divided oxalate precipitate is produced as compared to the oxalate precipitates formed by the prior known methods discussed above. The finely divided oxalate precipitates are calcined to form a finely divided oxide powder that sinters to a high optical clarity, comparable to the optical clarity of scintillators formed from milled oxalate or oxide powders in prior known methods. As a result, the higher optical clarity rare earth oxide ceramic scintillators can be formed without the need of milling oxalate or oxide powders prior to calcining or sintering respectively. In addition, powder contamination that can reduce the scintillating properties, and that can be introduced during milling, is minimized because milling is not required.

The rare earth oxide ceramic scintillators of this invention are comprised of an oxide of a rare earth from the group consisting of gadolinium, yttrium, lanthanum, lutetium, and mixtures thereof, and an oxide of a rare earth activator from the group consisting of europium, neodymium, ytterbium, dysprosium, terbium, and praseodymium. It is noted that when rare earth is used herein it is intended to include yttrium, which is sometimes categorized as a rare earth although not within the lanthanide series. The rare earth oxides are selected and processed in a way that retains a cubic crystal structure. Cubic materials are optically isotropic, that is, they have the same refractive index in all directions. The rare earth activator is adapted to cause the scintillator to convert incident radiation into light at a wave length compatible with available photo sensitive devices and at a reasonable conversion efficiency.

Preferred rare earth oxide ceramic scintillators are the yttria-gadolinia scintillators. As used herein, the term "yttria-gadolinia scintillators" means scintillators comprised of, in mole percent; about 5 to 50 percent $Gd_2O_3$, about 0.02 to 12 percent of a rare earth activator such as europium, neodymium, ytterbium, dysprosium, terbium, and praseodymium, and the remainder $Y_2O_3$. Materials containing less than about 5 mole percent $Gd_2O_3$ exhibit low x-ray stopping power for most practical detector design, while materials having more than 50 mole percent are increasingly non-cubic and exhibit poor optical clarity. The oxides of trivalent rare earth elements such as europium, neodymium, ytterbium, dysprosium, terbium, and praseodymium, are added to the basic rare earth oxide system as activators to enhance scintillator efficiency. Although not meant to be a complete list, examples of preferred compositions of the yttria-gadolinia scintillators are as follows: about 25 to 30 mole percent $Gd_2O_3$, about 1 to 6 mole percent $Eu_2O_3$, and the remainder $Y_2O_3$; about 30 mole percent $Gd_2O_3$, about 0.25 mole percent $Nb_2O_3$, and the remainder $Y_2O_3$; about 40 mole percent $Gd_2O_3$, about 0.15 mole percent $Tb_2O_3$, and the remainder $Y_2O_3$; about 40 mole percent $Gd_2O_3$, about 0.2 mole percent $Dy2O3$, and the remainder $Y_2O_3$.

The crystallographic and scintillation properties of $Y_2O_3$ are found to be similar to $Gd_2O_3$, however, the x-ray stopping power of $Y_2O_3$ is several times lower than $Gd_2O_3$, and requires a substantially thicker crystal and somewhat less optimum channel design for optimum light collection. Both $La_2O_3$ and $Lu_2O_3$ have high x-ray stopping power, comparable to or better than $Gd_2O_3$. An additional advantage of $Lu_2O_3$ is that it possesses a cubic crystal structure and can be made transparent by sintering as well by hot pressing. To form a stable cubic crystal structure, $La_2O_3$ is combined with $Y_2O_3$ in the same proportions as $Gd_2O_3$ is combined with $Y_2O_3$. Although not necessary, $Lu_2O_3$ can be combined with $Y_2O_3$ or $Gd_2O_3$ in about the same proportions as disclosed above for the yttria-gadolinia scintillators. Scintillators formed from $La_2O_3$ or $Lu_2O_3$ contain the rare earth activator in about the same proportion as described above for the yttria-gadolinia scintillators.

As used herein, the term "lutetia-gadolinia scintillators" means scintillators comprised of, in mole percent: about 5 to 50 percent $Gd_2O_3$, about 0.02 to 12 percent of a rare earth activator such as europium, neodymium, ytterbium, dysprosium, terbium, and praseodymium, and the remainder $Lu_2O_3$.

The rare earth oxide ceramic scintillators described above provide a cubic crystalline phase characterized by a high degree of scintillator material structural symmetry. Materials having such structure are particularly desirable for CT applications. Scintillator materials having increasing amounts of non-cubic phase, such as monoclinic phase, are characterized by lower relative light outputs and poor optical clarity due to grain boundary cracking and non-uniform crystalline structure. Materials having such non-cubic structure exhibit appreciable light scattering and reabsorbtion due to a longer effective relative path length for light transmission, thereby decreasing the amount of light available for detection by external photosensors.

Certain additives are useful in the rare earth oxide scintillators to reduce undesirable scintillator material luminescent afterglow, which may lead to undesirable distortion and the presence of artifacts in reconstructed images. Additions of about 0.15 to 0.7 mole percent $Yb_2O_3$, about 0.1 to 2 mole percent SrO, and about 0.1 to 2 mole percent CaO are useful as an afterglow reducer. Powders of the aforedescribed rare earth oxide composition scintillators may be formed into scintillators by sintering, sintering plus hot isostatic pressing, and ceramic hot pressing methods. However, prior to the fabrication of the ceramic scintillator a suitable powder containing the desired scintillator material constituents must be formed.

Suitable oxide powders of the rare earth oxide scintillators are prepared by wet chemical methods. The selected molar percentages of nitrates or chlorides of yttrium, gadolinium, europium, neodymium, ytterbium, dysprosium, terbium, praseodymium, and strontium, are dissolved in water, or, the respective oxides are dissolved in an aqueous nitric or hydrochloric acid solution, to form a dissolved rare earth solution. Preferably, the dissolved rare earth solution is filtered to remove insoluble matter, and diluted to a 0.1 to 0.2 molar aqueous rare earth solution.

The improvement in the method of this invention comprises precipitating the oxalates by admixing the rare earth solution with an oxalic solution of oxalic acid and ammonium ions in an amount that disperses the oxalate precipitates. Preferably, the ammonium ions are present in a ratio of at least one mole of ammonium ions per mole of rare earth ions. Most preferably, the ammonium ions are present in a ratio of about one to two moles ammonium ions per mole of rare earth ions. The oxalic solution is formed, for example, by adding an ammonium salt, e.g., ammonium carbonate, ammonium hydroxide, or ammonium citrate to an aqueous solution of oxalic acid, for example, about 80 percent saturated with oxalic acid at room temperature. The oxalic solution can also be formed by dissolving ammonium oxalate in water. Preferably, the water used in the aqueous solutions is distilled to minimize contamination of the oxalates with elements that reduce scintillating properties, such as iron, manganese, or silicon.

The oxalic solution is agitated while gradually adding the rare earth solution to form the respective oxalate precipitates. Agitation can be by any suitable non-contaminating means such as magnetic stirring, ultrasonic agitation, fluid turbulence mixing, or mechanical vibration, i.e., shaking. Preferably, the resulting oxalate precipitates are washed, neutralized, and filtered to remove excess oxalic acid and ammonium. The oxalates are filtered to remove excess liquid, and dried for several hours in air at about 75° C. to 125° C. Such drying forms a friable cake that can be granulated by pushing the friable cake through a mesh nylon screen, for example, about 20 mesh. The presence of the ammonium ion in the precipitation mixture causes a dispersed oxalate precipitate to form. As a result, articles of the material prepared by this precipitation process can be sintered to high optical clarity without using additional deagglomeration processes such as milling.

The ammonium dispersed oxalate coprecipitates provide a reduced particle size in the dried oxalate powder. The particle size of the rare earth oxide powder formed by the method of this invention approaches the size achieved after milling in the prior known methods. For example, an oxalate particle size of 5 microns or less can be formed by precipitating the oxalates in the presence of the ammonium ions in the oxalic solution. As a result, milling is not required to achieve a comparable high optical clarity in sintered scintillators formed from powder produced by the method of this invention. However, milling and screening of the oxalates can be performed in the method of this invention to achieve further improved optical clarity in the sintered scintillators. For example, improved optical clarity is achieved by dry or wet screening of oxalate powders through fine mesh, for example 100 to 325 mesh, nylon screens. Milling is preferably of the type that does not contaminate the oxalate or oxide powders. For example, jet air milling, or high energy vibration milling with a rigid organic polymer milling media, or a metallic milling media such as steel balls coated with the rigid organic polymer. A suitable rigid organic polymer milling media has a hardness of about 40 Shore scale D Durometer hardness or greater, for example organic polymers such as polyamides including nylon, polyethylenes, acetyls, and polyesters.

The oxalate powder is calcined in air, i.e., thermally decomposed, at approximately 700° C. to about 900° C. for a time ranging from 1 to 4 hours to form the corresponding oxides. Typically, heating for 1 hour at 800° C. is sufficient. The oxide powder is formed into a compact by either die pressing or die pressing followed by isostatic pressing to further increase green density. A die material which is inert with respect to the scintillator constituents is preferred to avoid undesired reactions and contaminations. Suitable die materials include alumina, silicon carbide, and metals such as molybdenum, hardened steel, or nickel-based alloys. The powder compacts are formed by die pressing at pressures between about 3000 pounds per square inch, psi., and 15,000 psi. Alternatively, the die pressed powder compacts may be isostatically pressed at between 10,000 psi. and 60,000 psi. to further increase powder compact green density. If any grinding aids, compaction aids, or lubricants such as waxes, have been used, an oxidation treatment to remove all organic additives can be employed prior to sintering.

The compacts are sintered in a high temperature furnace, for example having a tungsten heating element, in vacuum or a reducing atmosphere such as a wet hydrogen atmosphere, dew point of about 23° C. The compact is heated at a rate between approximately 100° C. per hour to 700° C. per hour to the sintering temperature of between 1800° C. and 2100° C., and held at the sintering temperature for about 1 to 30 hours to cause extensive densification and optical clarity development. After sintering, the compacts are cooled to room temperature over a period of time ranging from about 2 to 10 hours.

Sintered ceramic scintillators may also be prepared by a heating sequence which includes a hold at a temperature lower than the final sintering temperature. Typically, the powder compact is heated at a rate of between 300° C. and 400° C. per hour to a holding temperature of between 1600° C. and 1800° C. The holding period may range from about 1 to 20 hours, following which the temperature is raised to between about 1800° C. and 2100° C. for final sintering for between 1 and 10 hours. The increase from the holding temperature to the final sintering temperature is at a rate of about 25° C. to 75° C. per hour. A preferred heating sequence comprises heating the powder compact to a holding temperature of about 1700° C. in 5 hours, holding at 1700° C. for 8 hours, followed by heating to 1910° C. in 4 hours, and sintering at 1910° C. for 2 hours.

The various features and advantages of the method of this invention are further shown by the following Examples.

EXAMPLE 1

A rare earth solution was formed by dissolving about 20 grams of mixed oxides comprised of about 67 mole percent yttrium oxide, 30 mole percent gadolinium oxide, and 3 mole percent europium oxide in a solution of about 40 grams of nitric acid and water diluted to a final solution volume of 500 milliliters. The rare earth solution was filtered to remove insoluble matter and diluted to 1.75 liters with distilled water. An oxalic solution comprised of 34 grams of oxalic acid and 40 grams of di-ammonium citrate dissolved in 1.75 liters of distilled water was stirred while slowly adding the rare earth solution to form oxalate precipitates. The oxalate precipitate suspension was stirred about 1 minute, and filtered to remove the liquid. The oxalate precipitates were dried several hours at 105° C. in air to form a friable cake, and granulated by pushing the cake through a 20 mesh nylon screen.

The dried oxalate powder was calcined at 825° C. for 1.5 hours in air to form the corresponding oxide powder. The oxide powder was pressed at about 60,000 psi. in a steel die to form a pellet. The pressed pellet was heated in a flowing wet hydrogen atmosphere in a furnace equipped with a tungsten heating element with the following heating schedule: heat to 1700° C. in 5 hours, hold at 1700° C. for 8 hours, heat to 1910° C. in 4 hours, and hold at 1910° C. for 2 hours to sinter the pellet. The sintered pellet was cooled to room temperature in about 2 hours. The optical clarity of the sintered pellet was measured in an in-line transmission test for visible light, and had an in-line transmission of 38 percent for 1 millimeter thickness, and an attenuation coefficient of 7.5 inverse centimeters.

A rare earth solution was formed by dissolving about 10 grams of the mixed oxides in Example 1 in a solution of about 20 grams of nitric acid and water diluted to a final solution volume of 250 milliliters. The rare earth solution was filtered to remove insoluble matter and diluted to 1 liter with distilled water. An oxalic solution comprised of 17 grams oxalic acid and 20 grams of di-ammonium citrate dissolved in one liter of distilled water was stirred while slowly adding the rare earth solution to from oxalate precipitates. The oxalate precipitate suspension was stirred about one minute, and filtered to remove the liquid. Nitric acid was added to one liter of water until the pH of the water was about 3.0, and the water was used to wash the precipitate in the filter. The washed precipitate was dried, calcined, pressed, and sintered as described above in Example 1. The optical clarity of the sintered pellet was measured in an in-line transmission test for visible light and had an in-line transmission of about 42 percent for one millimeter thickness and an attenuation coefficient of 6.5 inverse centimeters.

EXAMPLE 3

A pellet of a rare earth oxide scintillator was formed according to the method in Example 1, but no diammonium citrate was added to the oxalic solution. The optical clarity of the sintered pellet was measured in an in-line transmission test for visible light, and had an in-line transmission of 0.1 percent for 1 millimeter thickness, and an attenuation coefficient of about 70 inverse centimeters.

EXAMPLE 4

A rare earth solution was formed according to the method in Example 2, and slowly stirred into an oxalic solution comprised of 18.9 grams of ammonium oxalate dissolved in one liter of distilled water. The mixture was stirred for one minute and the resulting oxalate precipitates were filtered to remove excess liquid. The oxalates were washed by filtering one liter of water through the precipitate. The precipitates were then dried, calcined, pressed, and sintered as described in Example 1. The optical clarity of the sintered pellet was measured in an in-line transmission test for visible light, and had an in-line transmission of 75.5 percent for 1 millimeter thickness, and an attenuation coefficient of 0.7 inverse centimeters.

EXAMPLE 5

An oxalate precipitate was formed according to the method described in Example 4, and the precipitate was filter washed with 5 liters of distilled water. The oxalate precipitate was then dried, calcined, pressed, and sintered as described in Example 1. The optical clarity of the sintered pellet was measured in an in-line transmission test for visible light, and had an in-line transmission of 56.1 percent for 1 millimeter thickness, and an attenuation coefficient of 3.7 inverse centimeters.

EXAMPLE 6

A rare earth solution was formed by dissolving about 25 grams of mixed oxides comprised of about 67 mole percent lutetium oxide, 30 mole percent gadolinium oxide, and 3 mole percent europium oxide in a solution of about 50 grams of nitric acid and water. The solution was filtered to remove any insoluble matter and then diluted to 250 millimeters with water. An oxalic solution comprised of 30 grams of oxalic acid and 35 grams di-ammonium citrate dissolved in 1.5 liters of distilled water was stirred while slowly adding the rare earth oxide solution to form oxalate precipitates. The oxalate precipitate suspension was stirred about one minute, and diluted to 12 liters with water and stirred briefly.

After several minutes, the precipitate had settled and most of the liquid was decanted. The precipitate was filtered to remove excess liquid and washed by filtration with an additional 6 liters of water. The oxalates were dried, calcined, and pressed into a compact as described above in Example 1. The pressed compact was heated in a flowing wet hydrogen atmosphere in a furnace equipped with a tungsten heating element with the following heating schedule: heat to 1800° C. in 5 hours, hold at 1800° C. for 16 hours, heat to 1960° C. in 4 hours, and hold at 1960° C. for 2 hours. The sintered pellet was cooled to room temperature in about 2 hours. The optical transparency of the sintered pellet was measured in an in-line transmission test for visible light, and had an in-line transmission of about 51.5 percent for 1 millimeter thickness and an attenuation coefficient of 4.5 inverse centimeters.

EXAMPLE 7

A rare earth solution was formed by dissolving about 10 grams of the mixed oxide composition described above in Example 6 in water with 20 grams of nitric acid. The rare earth solution was filtered and diluted to 250 milliliters with water. An oxalic solution comprised of 13.5 grams of ammonium oxalate dissolved in 1 liter of distilled water was stirred while slowly adding the rare earth solution. The oxalate precipitate suspension was stirred about one minute and then filtered to remove the liquid. The precipitate was washed by filtration with 1 liter of distilled water. The oxalate precipitate was then dried, calcined, cold-pressed, and sintered as described in Example 6, except the hold time at 1800° C. was 8 hours. The optical transparency of the sintered pellet was measured in an in-line transmission test for visible light and had an in-line transmission of about 37 percent for one millimeter thickness, and an attenuation coefficient of 7.7 inverse centimeters.

The rare earth oxide ceramic scintillators formed by the method of this invention in Examples 1,2, and 4–7 had a greatly improved optical clarity as compared to the rare earth oxide ceramic scintillator formed by the prior known method in Example 3.

What is claimed is:

1. A method of forming a polycrystalline rare earth oxide ceramic scintillator containing an oxide of a rare earth activator selected from the group consisting of europium, neodymium, ytterbium, dysprosium, terbium and praseodymium, having improved transparency that does not require milling, said scintillator being formed by dissolving a mixture of oxides of the scintillator composition in an aqueous hydrochloric or nitric acid solution to form a rare earth solution, precipitating oxalates from the rare earth solution, calcining the oxalates to form oxides, cold pressing the oxides to form a compact, and sintering the compact in a reducing atmosphere or vacuum to form the scintillator, the improvement comprising:
    precipitating the oxalates by admixing the rare earth solution with an oxalic solution comprised of, oxalic acid and ammonium ions in an amount that disperses the oxalate precipitates.

2. The method of claim 1 wherein the ammonium ions are in a ratio of at least about 1 mole of ammonium ions per mole of rare earth ions.

3. The method of claim 2 wherein the ammonium ions are in a ratio of about 1 to 2 moles of ammonium ions per mole of rare earth ions.

4. The method of claim 2 further comprising the step of washing the oxalate precipitates with water to remove excess ammonium or oxalate salts.

5. The method of claim 4 wherein the water has a pH between about 2 and 10.

6. The method of claim 2 further comprising the step of milling the oxalates

7. The method of claim 6 wherein the step of milling is vibration milling with a rigid organic polymer milling media.

8. A method of forming a polycrystalline yttria-dolinia scintillator having improved transparency that does not require milling said scintillator being formed by dissolving a mixture of oxides of the scintillator composition in an aqueous hydrochloric or nitric acid solution to form a rare earth solution, precipitating oxalates from the rare earth solution, calcining the oxalates to form oxides, cold pressing the oxides to form a compact, and sintering the compact in a reducing atmosphere or vacuum to form the scintillator, the improvement comprising:
    precipitating the oxalates by admixing the rare earth solution with an oxalic solution comprised of, oxalic acid and ammonium ions in an amount that disperses the oxalate precipitates.

9. The method of claim 8 wherein the ammonium ions are in a ratio of at least about 1 mole of ammonium ions per mole of rare earth ions.

10. The method of claim 9 wherein the ammonium ions are in a ratio of about 1 to 2 moles of ammonium ions per mole of rare earth ions.

11. The method of claim 9 further comprising the step of washing the oxalate precipitates with water to remove excess ammonium or oxalate salts.

12. The method of claim 11 wherein the water has a pH between about 2 and 10.

13. The method of claim 9 further comprising the step of milling the oxalates.

14. The method of claim 13 wherein the step of milling is vibration milling with a rigid organic polymer milling media.

15. A method of forming a polycrystalline lutetia-gadolinia scintillator having improved transparency that does not require milling said scintillator being formed by dissolving a mixture of oxides of the scintillator composition in an aqueous hydrochloric or nitric acid solution to form a rare earth solution, precipitating oxalates from the rare earth solution, calcining the oxalates to form oxides, cold pressing the oxides to form a compact, and sintering the compact in a reducing atmosphere or vacuum to form the scintillator, the improvement comprising:
    precipitating the oxalates by admixing the rare earth solution with an oxalic solution comprised of, oxalic acid and ammonium ions in an amount that disperses the oxalate precipitates.

16. The method of claim 15 wherein the ammonium ions are in a ratio of at least about 1 mole of ammonium ions per mole of rare earth ions.

17. The method of claim 16 wherein the ammonium ions are in a ratio of about 1 to 2 moles of ammonium ions per mole of rare earth ions.

18. The method of claim 16 further comprising the step of washing the oxalate precipitates with water to remove excess ammonium or oxalate salts.

19. The method of claim 18 wherein the water has a pH between about 2 and 10.

20. The method of claim 16 further comprising the step of milling the oxalates.

21. The method of claim 20 wherein the step of milling is vibration milling with a rigid organic polymer milling media.

* * * * *